United States Patent [19]

Nishida

[11] 4,294,880

[45] Oct. 13, 1981

[54] FOAMED POLYURETHANE ARTICLES WITH SKIN AND A METHOD FOR PRODUCING THE SAME

[75] Inventor: Masazo Nishida, Toyota, Japan

[73] Assignee: The Toyo Rubber Industry Co., Ltd., Osaka, Japan

[21] Appl. No.: 65,748

[22] Filed: Aug. 10, 1979

[30] Foreign Application Priority Data

Aug. 11, 1978 [JP] Japan .................................. 53/98446

[51] Int. Cl.³ .............................................. B29D 27/04
[52] U.S. Cl. ................................... 428/315; 264/46.6; 264/250; 264/255; 428/423.3
[58] Field of Search ..................... 264/46.6, 46.4, 250, 264/255; 428/315, 423.3

[56] References Cited

U.S. PATENT DOCUMENTS 2,908,943 10/1959 Miller .................................. 264/46.6
3,487,134 12/1969 Burr .................................... 264/46.6
3,873,407 3/1975 Kumata et al. ................. 264/46.6 X

*Primary Examiner*—Philip Anderson
*Attorney, Agent, or Firm*—Wenderoth, Lind & Ponack

[57] ABSTRACT

A molded polyurethane article consisting of a foamed polyurethane core and a polyurethane surface skin layer as molded together as an integral unit. The above polyurethane article is produced by forming the surface skin layer of a surface-forming polyurethane composition rendered thixotropic by adding an aliphatic or functionally equivalent primary diamine as one of active hydrogen compounds in the composition and the surface layer so formed is caused to be bonded to a polyurethane core upon foaming of a foamable polyurethane composition to provide an integral article.

7 Claims, No Drawings

FOAMED POLYURETHANE ARTICLES WITH SKIN AND A METHOD FOR PRODUCING THE SAME

BACKGROUND OF THE INVENTION

1. Field of the Invention:

This invention relates to a molded polyurethane article comprising a polyurethane foam core member and a skin layer formed integrally with said core member, and a method for producing said molded polyurethane article.

There are known a variety of products manufactured by thermoforming a polyvinyl chloride film into a predetermined shape, applying the shaped film to a foaming mold, pouring a foamable polyurethane composition into the mold and causing the polyurethane to foam and cure to yield a shaped article consisting of a foamed polyurethane core and and a polyvinyl chloride surface film as integrally joined thereto. These products are used in such applications as automotive and rolling stock cushions, pads, etc. This invention is not concerned with such products but with molded polyurethane articles, the skin layer of which is also made of polyurethane and a method of producing such polyurethane articles.

2. Prior Art:

A variety of molded polyurethane articles are known which have a skin layer also made of polyurethane. For example, a known process for producing such articles comprises depositing a hot melt polyurethane elastomer powder electrostatically on the internal surface of a mold, heating the mold to the fusing temperature of the elastomer to obtain a film, applying the film to a foaming mold (if necessary, a vacuum is applied to the film to bring it into intimate contact with the internal surface of the mold), pouring a foamable polyurethane solution into the formed film in the latter mold and causing the polyurethane to foam and cure. This method is however disadvantageous in that at the fusing and film-forming stage, the fused polyurethane elastomer flows at the flanged or deeply grained parts of the film-forming mold to leave only a thin film there.

There is also known a method which comprises spraying the inner surface of a film-forming mold with a two-pack type composition and causing the composition to cure. By this method, it takes several minutes to obtain a cured film. The corner of a mold is a line, though this may be an exaggeration, and even if it is actually a plane, it is a curved plane with a large radius of curvature. Therefore, at such linear or curved corner, or hanging surfaces, the composition flows away before it has been sufficiently cured until it is no longer able to flow in the absence of an external force, thus giving a very thin film. The above situation holds when the two-pack composition has been sufficiently diluted to an easily sprayable concentration or when the undiluted composition is applied by the airless high pressure spraying technique.

Another method, which has already been commercially applied, comprises preparing a coating composition from a sufficiently chain-extended polyurethane elastomer as the vehicle and a solvent and spraying the patterned inner surface of a mold with coating composition to produce a film. If a suitable solvent is chosen, this procedure yields a film having the desired thickness even in corner areas. This is because the elastomer which has been polymerized to a sufficiently high molecular weight is deposited on the inner surface of the mold so that only if the proper spraying technique, solvent and other conditions are selected, there is produced a film having a substantially uniform thickness even in corner areas.

However, since the polyurethane elastomer has a high molecular weight, it must be sufficiently diluted (a few to more than 10% concentration). Therefore, the large quantity of solvent must be employed and it results in high production costs, and moreover it is only possible to produce comparatively thin films (not more than 100 u). Thus, by any of the conventional methods it is not possible to produce a film having adequate strength, a uniform distribution of thickness and sufficient tenacity. Thus, it is not possible to obtain a desirable molded polyurethane article having a satisfactory skin layer by taking out such product film, with the desired shape retained, from a skin-forming mold, fitting the same film in a separate foaming mold and pouring a foamable polyurethane solution into the latter mold and causing the polyurethane foam and cure.

SUMMARY OF THE INVENTION

It is therefore an object of this invention to provide a molded polyurethane article having a uniform polyurethane surface skin layer and a method for producing such a surfaced article, wherein the skin-forming polyurethane material does not flow within the mold to provide a skin layer of uniform thickness over the entire surface.

It is another object to provide a method for producing a molded polyurethane article having a surface skin layer, wherein despite the less flowability of the skin-forming polyurethane material at the time of skin formation, the same material can be easily sprayed or coated onto the inner surface of the mold, and the polyurethane article obtainable by said method.

A further object of this invention is to provide a method of producing a molded polyurethane article having a surface skin layer, which is able to yield a comparatively thick surface skin which has sufficient strength and tenacity and which is suited for large-sized products. A principal feature of this invention lies in the use of a special viscous polyurethane material having a thixotropic property or Bingham body as a skin-forming material.

The special viscous polyurethane material can be obtained by incorporating in a polyol-isocyanate composition an active hydrogen compound which is an aliphatic primary diamine or an equivalent primary diamine, i.e. a primary alkylene diamine of benzene having amino groups attached to the alkylene side chain of the benzene ring instead of being directly attached to the benzene ring (hereinafter the above two diamines will be referred to as an aliphatic or equivalent primary diamine.)

In accordance with this invention, the above special thixotroptic polyurethane material is caused to form a surface skin prior to the foaming reaction of the foamable polyurethane composition which is to provide a core member within the foaming mold or, alternatively, such a skin layer is previusly formed on a surface skin forming mold and, after the resulting skin is fitted into the foaming mold, the foamable polyurethane solution is poured into the latter mold to thereby provide a molded polyurethane article consisting of a core member and a surface skin layer as formed integrally with said core member.

Various features of this invention will hereinafter be described in detail.

DETAILED DESCRIPTION OF THE INVENTION

For a primary diamine, in the conventional urethane foam or elastomer composition, there has been commonly used an aromatic primary diamine such as 3,3'-dichloro-4,4'-diaminodiphenylmethane. For special purposes, methylenedianiline has also been used as the reactive chain extender. In contrast, the aliphatic or equivalent primary diamine employed according to this invention is very highly reactive and, because of this, is usully not employed as a component of the polyurethane composition. It has been found, however, that if said aliphatic or equivalent primary diamine is present at a suitable concentration in the polyol component, admixture of the active hydrogen component (polyol plus said diamine) with the isocyanate component yields an initial reaction product which exhibits a peculiar rheological behavior. The object of this invention has been accomplished by taking advantage of the above unique behavior.

Thus, an aliphatic or equivalent primary diamine is well dispersed in the polyol component and, then the isocyanate component such as toluene diisocyanate (briefly, TDI) is added, the aliphatic or equivalent primary diamine reacts with the isocyanate so rapidly before the other polyols such as terminally-activated polypropylene triol and ethylene glycol are allowed to react, the entire mixture becomes a thixotropic mixture of Bingham body. When the mixture is stirred in a beaker and the propeller of the stirrer is raised, the surface turbulence or pattern of the mixture is seen to remain unchanged. If the beaker is held in a hand and its bottom is tapped against the desk top, the impact results in a different configuration of the surface pattern. This means the following;

Thus, with an airless spray apparatus for 2-component spray use (e.g. Ransburg's Probla), airless spraying is carried out in the routine manner using the isocyanate component on the one hand and the polyol-aliphatic or equivalent amine component on the other hand. At the moment said two components are mixed in the mixing chamber at the tip of the airless gun, the above-mentioned reaction takes place to yield said initial reaction product. In this stage, the remaining ingredients remain unreacted. Because of the markedly, thixotropic property of this initial reaction product, the mixture can be as easily sprayed onto the inner surface of the mold under the influence of a large shearing force (spray pressure 50–150 Kg/cm$^2$) as it is the case with the composition free of the aliphatic or equivalent primary diamine. When the spray mist has reached the skin-forming mold and formed a skin layer there, it is no longer subject to an external force but subject only to gravity so that the composition does not flow any longer. The skin so formed is either allowed to stand or oven-cured. After curing, the cured skin is removed and fitted into the foaming mold and the foamable polyurethane stock solution is poured into this mold and caused to foam in situ. In this manner, the desired foamed polyurethane article having a surface skin layer is obtained. The thickness of the skin layer is desirably not less than about one millimeter. If the film is thinner than 0.5 mm, it is liable to be deformed and may not be placed securely in position and in fixed configuration within the foaming mold, although the application of a vacuum may help overcome such difficulties.

The polyurethane material for said thixotropic or Bingham body for the formation of said skin layer will now be described by way of the following example.

TABLE 1

| (Composition of polyurethane material for surface skin layer) | | |
|---|---|---|
| | Parts by weight | |
| | (a) | (b) |
| Polypropylene ether triol (3000) | 100 | 100 |
| Ethylene glycol | 5 | 4.1 |
| Xylylenediamine | — | 2.0 |
| TDI | 45 | 45 |

In the above table, (a) is the conventional general composition containing triol and glycol, while (b) is the composition of this invention which contains as the active hydrogen component, triol, glycol and xylylendiamine. As mentioned above, the latter composition gives a special thixotropic material. When the above active hydrogen component is admixed with toluene diisocyanate TDI) at room temperature, composition (b) is not free-flowing immediately after admixing, i.e. in a condition that may be likened to soft ice cream or paste. In contrast, the conventional composition (a) is a readily flowable liquid with a viscosity of about 400 cps. These mixtures are each allowed to react at 70° C. for 2 hours, whereupon composition (a) assumes a viscosity of 35000 cps at 20° C. while the viscosity of the mixture containing composition (b) cannot be measured with a rotary viscosimeter because, being a thixotropic or Bingham body, the latter mixture does not follow the rotor of the viscosimeter.

The above prepolymers (a) and (b) are each diluted with a mixture of toluene and methyl ethyl ketone to a viscosity that permits measurements with a B-type rotary viscosimeter to asertain the difference in viscosity from the difference in the number of revolutions of the rotor.

While, substantially speaking, the viscosity of a Newtonian fluid cannot be measured with a B-type viscosimeter, it has been found that the prepolymer (b) according to this invention shows a sudden viscosity drop as the number of revolutions is increased. This is a kind of structural viscosity. That a composition is thixotropic can be ascertained from the fact the its viscosity changes as the number of rotor revolutions is progressively altered.

Tables 3 and 4 show the results of viscosity measurements, repeated in the order indicated by arrow-marks in the tables, using a B-type viscosimeter for the conventional prepolymer (a) and the prepolymer of this invention (b). The solutions prepared for viscosity measurement are shown in Table 2.

TABLE 2

| (Solution for viscosity measurement) | | |
|---|---|---|
| | Prepolymer (a) | Prepolymer (b) |
| Prepolymer for surface skin (g) | 200 | 200 |
| Toluene + methyl ethyl ketone (g) | 60 | 70 |

TABLE 3

(Viscosity values)
Prepolymer (a)

| R.P.M. of rotor | Viscosity(CPS) | " | " | " |
|---|---|---|---|---|
| 6 | 6500 | 6400 | 6500 | |
| 12 | 6150 | 6500 | 6400 | |
| 30 | 6600 | 6500 | 6400 | |
| 60 | 6510 | 6510 | 6500 | |

TABLE 4

(Viscosity values)
Prepolymer (b)

| R.P.M. of rotor | Viscosity (CPS) | " | " | " |
|---|---|---|---|---|
| 6 | 16300 | 12300 | 12200 | 12500 |
| 12 | 13500 | 10200 | 10900 | 9450 |
| 30 | 10200 | 9360 | 9440 | 9120 |
| 60 | 8990 | 8650 | 8650 | 8440 |

In the composition (b) of Table 1, the concentration of xylylenediamine was reduced to prepare the composition of Table 5. After mixing and stirring, viscosity measurements were carried out at 1, 5 and 40 minutes. In this case, too, intensely thixotropic properties were observed as shown in Table 6.

TABLE 5

(Composition for viscosity measurement)

| | |
|---|---|
| Polypropylene ether triol (OH value 35) | 100 g |
| Triethanolamine | 3 g |
| Xylylenediamine | 0.5 g |
| TDI prepolymer (NCO30.5%) | 21 g (NCO index 117) |

TABLE 6

(Viscosity values)

| R.P.M. of rotor | Time (min.) | | |
|---|---|---|---|
| | 1 | 5 | 40 |
| 6 | 30000 cP | 35000cP | 47500 cP |
| 12 | 11000 | 12600 | 28750 |
| 30 | 6600 | 6800 | 17500 |
| 60 | 4800 | 5050 | 5700 |

The same thixotropic condition immediately after admixing was noted also when ethylenediamine or diethylenetriamine was used in place of xylylenediamine.

It will be apparent from the above examples that since the method of this invention employs a thixotropic polyurethane material, it is easy to apply the material to a skin-forming mold or the inner surface of a foaming mold, for example, by way of spraying and, once it has been so applied, its fluidity is much limited even in an initial phase from the chain extension to the curing reaction of the polyurethane material, thus providing a skin faithfully following any surface irregularity of the inner surface of the mold. In this manner, a surface skin layer having a uniform thickness over the entire area can be produced at low cost, thus allowing a satisfactory molded polyurethane article having an excellent surface skin layer to be produced. Thus, the method of this invention is very effective in the production of large-sized, thick crush pads, seats, saddles and other products at low costs.

What is claimed is:

1. A method of producing a molded polyurethane article having a foamed polyurethane core member and a polyurethane surface skin layer formed as an integral unit, consisting essentially of the steps of spraying the inner surface of a foaming mold with a polyurethane composition to prepare a surface skin layer in the mold, pouring a foamable polyurethane solution into said mold and causing the polyurethane to foam and cure, thereby forming said integral unit, wherein the polyurethane composition used for the polyurethane surface skin layer is a two-part system consisting of (1) an organic polyisocyanate, and (2) polyols mixed with an aliphatic or equivalent aliphatic aromatic primary diamine in which the amino groups are attached to an aliphatic side chain, whereby in advance of the formation of the surface skin layer, an initial reaction product of said organic polyisocyanate and said aliphatic or equivalent aliphatic aromatic primary diamine having thixotropic properties is caused to be formed on the inner surface of the foaming mold; said reaction product being formed during the spray operation in which said two component polyurethane system is sprayed from a spray-coating apparatus used for two-component spraying and whereby the reaction product is formed in the mixing chamber.

2. A method of producing a molded polyurethane article having a foamed polyurethane core member and a polyurethane surface skin layer formed as an integral unit, consisting essentially of the steps of spraying the inner surface of a skin-forming mold with a polyurethane composition to prepare a surface skin layer in the mold, transferring the skin layer into a foaming mold, pouring a foamable polyurethane solution into the foaming mold and causing the polyurethane to foam and cure, thereby forming said integral unit, wherein the polyurethane composition used for the polyurethane surface skin layer is a two-part system consisting of (1) an organic polyisocyanate and (2) polyols mixed with an aliphatic or equivalent aliphatic aromatic primary diamine in which the amino groups are attached to an aliphatic side chain; whereby in advance of the formation of the surface skin layer, an initial reaction product of an organic polyisocyanate and an aliphatic or equivalent aliphatic aromatic primary diamine having thixotropic properties is caused to be formed in the inner surface of the skin-forming mold; said reaction product being formed during the spray operation in which said two-component polyurethane system is sprayed from a spray-coating apparatus used for two-component spraying and whereby the reaction product is formed in the mixing chamber.

3. A method of producing a molded polyurethane article as claimed in claims 1 or 2, wherein said aromatic aliphatic primary diamine mixed with said polyols is xylylenediamine.

4. A method of producing a molded polyurethane article as claimed in claims 1 or 2, wherein said aliphatic primary diamine mixed with said polyols is ethylenediamine.

5. A method of producing a molded polyurethane article as claimed in claim 1 or 2, wherein said aliphatic primary diamine mixed with said polyols is diethylenetriamine.

6. A method of producing a molded polyurethane article claimed in claims 1 or 2, wherein the polyols are polypropylene ether triol and ethylene glycol.

7. A molded polyurethane article having an inner foamed polyurethane core member and a polyurethane surface skin layer of a uniform thickness produced by the method of claims 1 or 2.

* * * * *